United States Patent [19]

Sakurai et al.

[11] Patent Number: 4,658,888
[45] Date of Patent: Apr. 21, 1987

[54] AIR CONDITIONER SYSTEM FOR AUTOMOBILES

[75] Inventors: Yoshihiko Sakurai; Mamoru Masauji, both of Konan, Japan

[73] Assignee: Diesel Kiki Co., Ltd., Tokyo, Japan

[21] Appl. No.: 810,690

[22] Filed: Dec. 18, 1985

[30] Foreign Application Priority Data

Dec. 28, 1984 [JP] Japan ................................ 59-279941

[51] Int. Cl.⁴ .............................................. B60H 3/00
[52] U.S. Cl. ...................................... 165/22; 62/209; 236/78 B
[58] Field of Search ...................... 165/22, 43; 62/209, 62/229; 236/78 B

[56] References Cited

U.S. PATENT DOCUMENTS

| | | | |
|---|---|---|---|
| 3,820,713 | 6/1974 | Demaray | 165/22 |
| 3,901,310 | 8/1975 | Strawn | 165/22 |
| 4,187,543 | 2/1980 | Healey | 165/22 X |
| 4,192,455 | 3/1980 | Rasmussen et al. | 237/8 R |

Primary Examiner—William E. Wayner
Attorney, Agent, or Firm—Wenderoth, Lind & Ponack

[57] ABSTRACT

An automotive air conditioner system including a first detector for detecting a cooling load in the front-seat space of a vehicle passenger compartment, a second detector for detecting a cooling load in the rear-seat space, a discriminator for selecting a larger one of the detected cooling loads, and a controller for controlling operation of a refrigerant compressor in accordance with the selected cooling load.

3 Claims, 6 Drawing Figures

AIR CONDITIONER SYSTEM FOR AUTOMOBILES

BACKGROUND OF THE INVENTION

1. Field of the Invention

The present invention relates to an air conditioner system for automobiles which is constructed to blow cooled air separately into the front seat space and the rear seat space of a vehicle passenger compartment. More particularly, it relates to such air conditioner system including an improved compressor controller.

2. Prior Art

In recent years, there is a tendency for automotive air conditioner system toward high-grade. Typical examples of such high-grade automotive air conditioner system are shown in Japanese patent publication No. 58-7486 and Japanese patent Laid-open publication No. 57-167819 wherein air passed through an evaporator is blown into a front-seat space and a rear-seat space, separately, under the control of air-mix doors provided respectively for the front-seat and rear-seat spaces to automatically control the temperature of air before the latter is discharged.

According to the foregoing systems, the temperature control of blown-off air is done solely by the air-mix doors without taking the control of a compressor into consideration. In an air conditioner system employing a conventional fixed thermo-control, on-off control of the compressor is effected at a temperature near the freezing point of a refrigerant. With this arrangement, the compressor is much oversized when both the front-seat and rear-seat spaces have small cooling load, resulting in an excess power consumption. Another air conditioner system shown in Japanese Patent Publication No. 58-39083 employs a variable thermo-control for adjusting the on-off temperature of a compressor in accordance with thermal loads either one of the front-seat and rear-seat spaces, and generally with thermal load of the front-seat space. Accordingly, when the front-seat space is smaller in thermal loads than the rear-seat space, the on-off temperature of the compressor becomes high with the result that only an insufficient cooling is achieved at the rear-seat space and conform of occupants therein cannot be maintained.

SUMMARY OF THE INVENTION

It is accordingly an object of the present invention to provide an air conditioner system for automobiles in which a suitable air temperature control is achieved with minimum energy consumption.

According to the present invention, the foregoing and other objects are attained by an air conditioner system for a vehicle driven by an engine and including a passenger compartment composed of a front-seat space and a rear-seat space, comprising: a refrigerant compressor driving connected with the engine; a duct unit communicating with the front-seat and rear-seat spaces for blowing cool air separately into the front-seat space and the rear-seat space, said duct unit including an evaporator held in fluid communication with said compressor for cooling air passing therethrough; first means for detecting a cooling load of the front-seat space; second means for detecting a cooling load of the rear-seat space; third means operative connected with said first and second detecting means for discriminating magnitude of the cooling loads thus detected; and forth means operative connected with said discriminating means and said compressor for controlling the latter according to a predetermined pattern based on the result of discrimination of said discriminating means.

Many other advantages and features of the present invention will become manifest to those versed in the art upon making reference to the detailed description and the accompanying sheets of drawings in which a preferred structural embodiment incorporating the principles of the present invention is shown by way of illustrated example.

DETAILED DESCRIPTION

The present invention will now be described in detail with reference to the illustrated embodiment.

Figure 2:
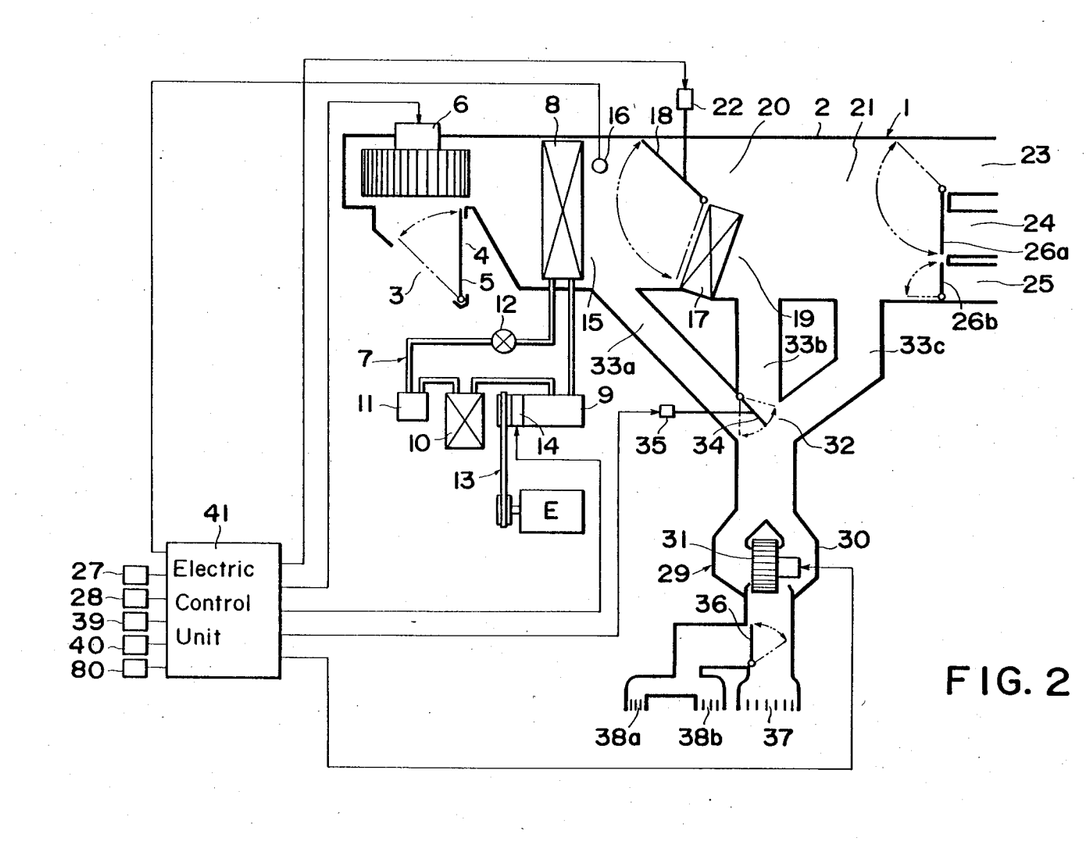
FIG. 2 is a schematic view showing structural details of main portion of the air conditioner system shown in FIG. 1.

Referring to FIG. 2, there is shown an air conditioner system according to the present invention. The air conditioner system comprises a main or front-seat air conditioner unit 1 including a main air flow duct 2 which has a recirculated air inlet 3 and an outside air inlet 4 provided in branched fashion. A door 5 is provided between the branched inlets 3 and 4 to select one of the inlets 3, 4.

A main blower 6 is disposed in the main duct 2 immediately downstream of the inlets 3, 4 to force air through the duct 2 from left to right either from the recirculated air inlet 3 or the outside air inlet 4. An evaporator 8 is disposed downstream of the main duct 2 and forms part of a refrigeration system 7.

The refrigeration system 7 comprises, in addition to such evaporator 8, a refrigerant compressor 9, a condenser 10, a reserved or container 11 and an expansion valve 12. The compressor 9 is driving connected with an engine E of a vehicle via a belt drive unit 13 and a magnetic clutch 14.

The evaporator 8 cools air passing therethrough and the cooled air then flows through a cool air passage 15 defined downstream of the evaporator 8. A mode sensor 16 is disposed in the cool air passage 15 for substantially detecting the temperature of the evaporator 8, the mode sensor 16 being connected with an electric control unit 41 described below.

A heater core 17 is disposed downstream of the evaporator 8. A first air mix door 18 is disposed in front of the heater core 17 for controlling the ratio of the amount of air passing through a hot air passage 19 including the heater core 17, to the amount of air passing through a bypass passage 20 extending parallel to the hot air passage 19. The hot air passage 19 and the bypass passage 20 are blended at a main air mix chamber 21 where air streams passed through the passages 19, 20 are mixed up, thereby controlling the temperature of air to be discharged into a front-seat space VA of the vehicle passenger compartment. The first air mix door 18 is operative controlled by a first actuator 22 to move between a full heat position in which the air passes solely through the heater core 17, and a full cool position in which the entire air bypasses the heater core 17.

The comperature controlled air is discharged into a front-seat space VA of the vehicle passenger compartment through a front upper outlet or a vent outlet 23, a front lower outlet or a heat outlet 24, and a defroster outlet 25. A door 26a selects the upper outlet 23 or the lower outlet 24 whereas a door 26b is operable to open or block the defroster outlet 25.

The front-seat space VA includes disposed therein a front-seat temperature sensor 27 for detecting the temperature Tr of the front-seat space VA, and a front-seat temperature setter 28 for setting the temperature Td of the front-seat space VA, the temperature sensor 27 and the temperature setter 28 being connected with the electric control unit 41.

The air conditioner system also includes a rear-seat blower unit 27 including a rear-seat duct 30 and a rear-seat blower 31 for forcing air through the duct 30. The rear-seat duct 30 includes a rear-seat air mix chamber 32 disposed upstream of the blower 31. The air mix chamber 32, in the illustrated embodiment, communicates with the main duct 2 through first to third connecting passages 33a–33c. The first connecting passage 33a has an inlet opening to the cool air passage 15 defined between the evaporator 8 and the heater core 17. The second and third connecting passages 33b, 33c have respective inlets opening to the main duct 2 downstream of the heater core 17.

The third connecting passage 33c is used to introduce the air from the main air mix chamber 21 into the rear-seat air mix chamber 32 for determining a reference temperature of air to be blown into a rear-seat space VB of the vehicle passenger compartment. The air temperature control for the rear-seat space VB is achieved when the third connecting passage 33c is omitted. The inlet of the third connecting passage 33c may be connected with a passage leading to the vent outlet 23.

A second air mix door 34 is disposed between outlets of the first and second connecting passages 33a, 33b that open to the rear-seat air mix chamber 32, so that a proportion of air passing through the first connecting passage 33a is adjustable depending on the position of the second air mix door 34. The door 34 is operative controlled by a second actuator 35 for determine the temperature of air to be blown into the rear-seat space VB.

The rear-seat duct 30 is bifurcated into two branch duct portions at a position downstream of the blower 31. A rear-seat mode door 36 is disposed between the bifurcated branch duct portions, one of which has a central vent outlet 37 facing to the rear-seat space VB of the passenger compartment, the vent outlet 37 being disposed centrally between two front seats. The other branch duct portion is further bifurcated into left and right outlets 38a, 38b. The rear-seat mode door 36 is operated to select the outlet 37 or the outlets 38a, 38b through which temperature controlled air is blown into the rear-seat space VB.

The rear-seat space VB includes a rear-seat temperature sensor 39 for detecting the temperature Tr′ of the rear-seat space VB and a rear-seat temperature setter 40 for setting the temperature Td′ of the rear-seat space VB. The temperature sensor 39 and the temperature setter 40 are connected with the electric control unit 41.

The electric control unit 41 functions first receives the signals from the mode sensor 16, front-seat temperature sensor 27, front-seat temperature setter 18, rear-seat temperature sensor 39 and rear-seat temperature setter 40 as well as the signal from an ambient temperature sensor 80 for detecting the temperature outside the vehicle passenger compartment, then to process the input signals through computation and amplification for controlling the main blower 6, magnetic clutch 14, first actuator 22, rear-seat blower 31 and second actuator 35.

To this end, the electric control unit 41 comprises a microcomputer of the type known per se, including a central processing unit (CPU), a random access memory (RAM), a read only memory (ROM) and input and output gates (I/O). Operation of the control unit 41 is described below with reference to the flow chart shown in FIG. 3.

Figure 3:
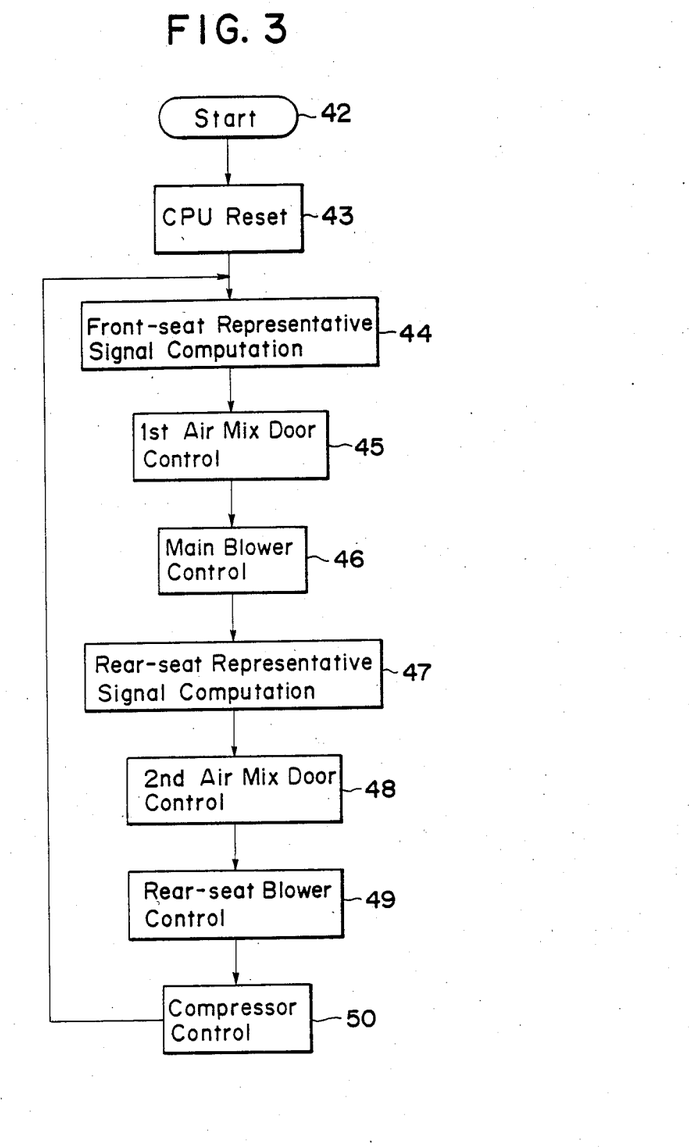
FIG. 3 is a flow chart showing a main routine achieved by an electric control unit of the air conditioner system.

When a main switch is closed the microcomputer is operated to execute a pre-recorded program successively from a first step 42. In the next step 43, the CPU is reset to clear up its content and then the computation is started in a step 44.

In the step 44, signals indicative of the temperatures Tm, Tr and Td are imputed into the microcomputer wherein a front-seat representative signal T is computed in accordance with the following equation.

$$T = (Tr - 25) + K_1(Ta - 25) + K_2(Tm - Tmo) - K_3(Td - 25) \quad (1)$$

where $K_1$, $K_2$ and $K_3$ are gains of the respective sensors and setters and Tmo is a reference value of the mode sensor 16.

Figure 4:
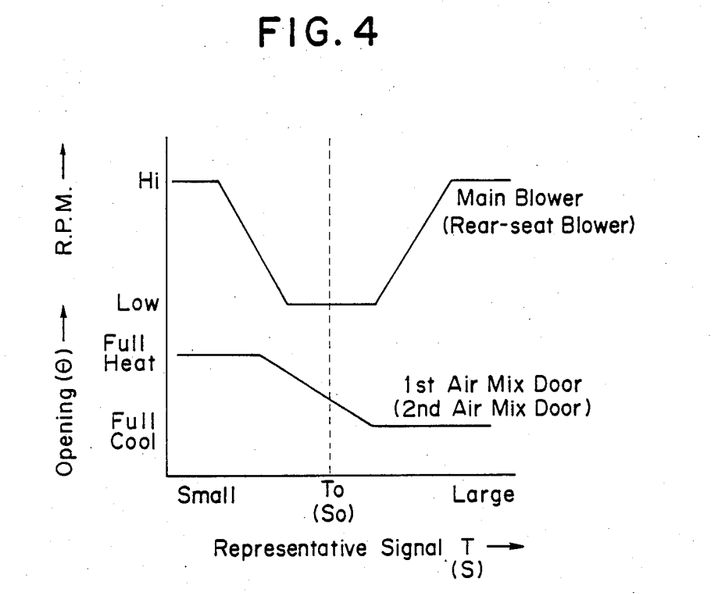
FIG. 4 is a graph illustrative of controlling properties of a in blower and a first air-mix door as well as properties of a rear-seat blower and a second air-mix door.

In the subsequent stapes 45 and 46, a first air mix door control signal and a main blower control signal are computed for controlling the first actuator 22 and operation of the main blower 6 and in such a manner that the position of the first air mix door 18 and the r.p.m. of the main blower 6 demonstrate properties (FIG. 4) stored in ROM which correspond to the signal T obtained by the foregoing equation (1).

In the next step 47, signals indicative of the temperatures Tr′ and Td′ are imputed and a rear-seat representative signal S is computed based on the following equation.

$$S = (Tr' - 25) - K_4(Td' - 25) \quad (2)$$

where $K_4$ is a gain of the setter.

In the subsequent steps 48 and 49, a second air mix door control signal and a rear-seat blower control signal are computed for controlling the second actuator 35 and operation of the rear-seat blower 31 in such a manner that the position of the second air mix door 34 and the r.p.m. of the rear-seat blower 31 realize the properties stored in ROM (FIG. 4) which correspond to the signal S obtained by the foregoing equation (2).

In the following step 50, a magnetic clutch control signal is determined based on the signals indicative of the temperatures Tr, Td, Tr′ and Td′ and then the signal is output to magnetic clutch 14 to thereby control operation of the compressor 9. At the end of the step 50, the computation is returned to the step 44 and the similar computational operations as previously mentioned are repeated. The control routine in the step 50 is described with reference to a flow chart shown in FIG. 5.

Figure 5:
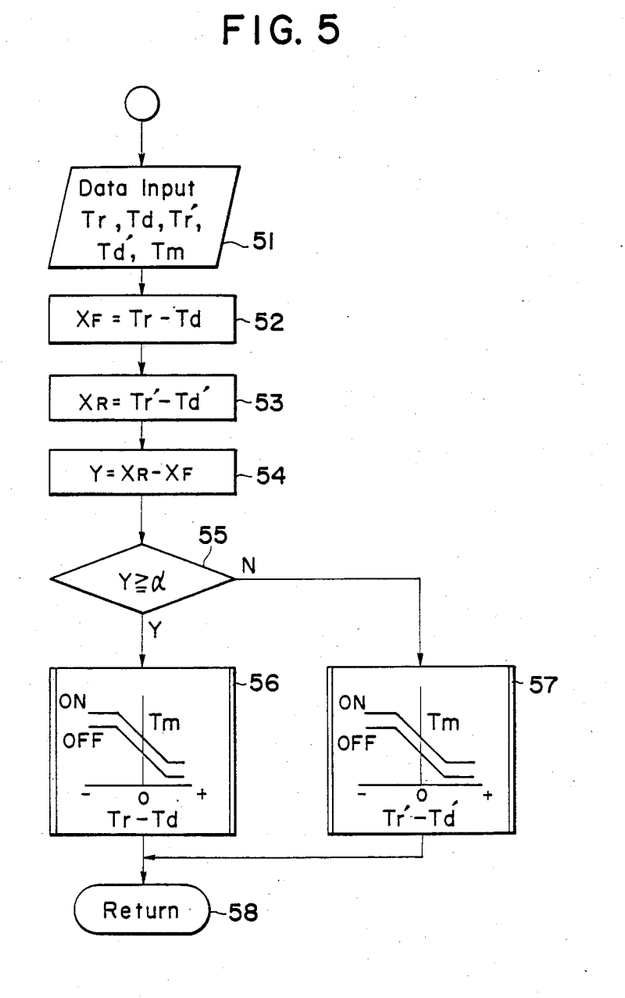
FIG. 5 is a flow chart showing a routine for controlling a compressor of the air conditioner system.

In the first step 51, the temperature signals Tr, Td, Tr', Td' and Tm are imputed. In the following step 52, a temperature difference $X_F$ between the front-seat space temperature Tr and the setting temperature Td for the front-seat space VA is computed, and in the subsequent step 53, a temperature difference $X_R$ between the rear-seat space temperature Tr' and the setting temperature Td' for the rear-seat space VB.

In the next step 54, the temperature difference $X_F$ obtained in the step 52 is subtracted from the temperature difference $X_R$ obtained in the step 53 to obtain a value Y.

In the following step 55, the computed value Y is compared with a predetermined value $\alpha$, and when the value Y is larger than the predetermined value $\alpha$, i.e. the front-seat space VA has a greater cooling load than the rear-seat space VB ($X_F$ is greater than $X_R$), operational sequence advances to the step 56. On the contrary, if the value Y is smaller than the predetermined value $\alpha$, i.e. the rear-seat space VB has a greater cooling load than the front-seat space VA ($X_R$ is greater than $X_F$), operational sequences go to the step 56.

In the step 56, the on-off temperature of the compressor 9 is controlled to demonstrate a value in a predetermined pattern with respect to the computed value $X_F$ (Tr−Td), the pattern being indicated by the temperature of the evaporator 8 and then operation is returned to the main routine.

In the step 57, the on-off temperature of the compressor 9 is controlled to demonstrate a value in a predetermined pattern with respect to the computed value $X_R$ (Tr'−Td'), the pattern being indicated by the temperature of the evaporator 8 and then operation is returned to the main routine.

Figure 1:
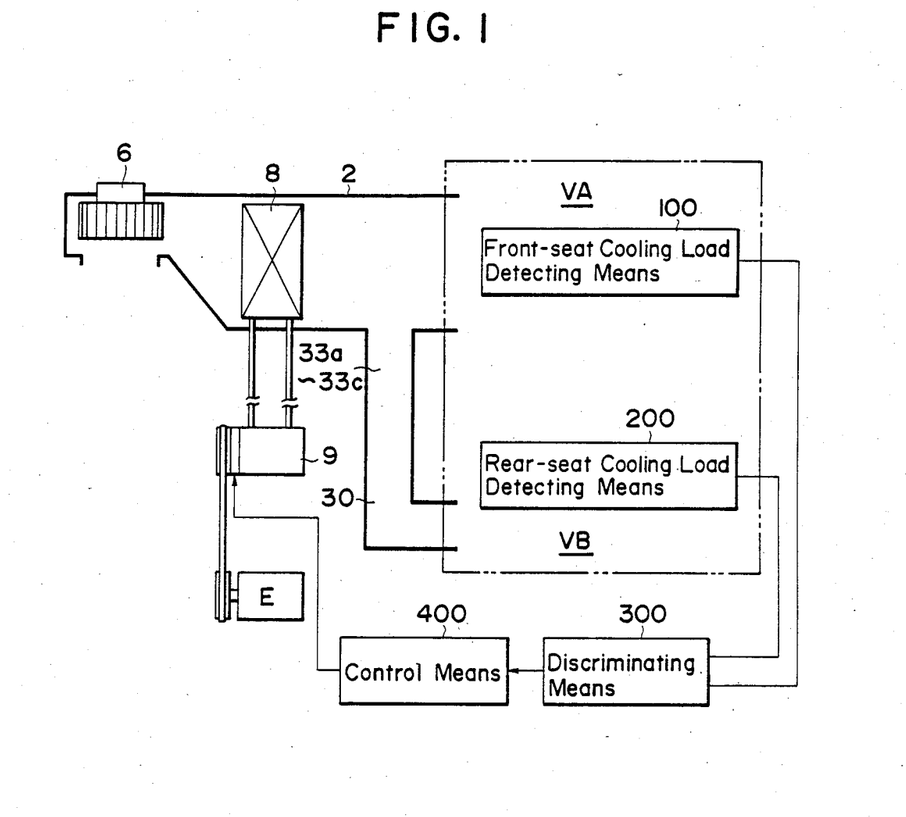
FIG. 1 is a schematic view showing the general construction of an air conditioner system according to the present invention.

In the illustrated embodiment, the front-seat space temperature sensor 27, the front-seat space temperature setter 28 and the computing step 52 jointly constitute a front-seat cooling load detecting means 100, whereas the rear-seat space temperature sensor 39, the rear-seat space temperature setter 40 and the computing step 53 jointly constitute a rear-seat cooling load detecting means 200. The steps 54 and 55 constitute a discriminating means 300, and the steps 56 and 57 constitute a controlling means 400, all the means 100-400 being shown in FIG. 1.

Figure 6:
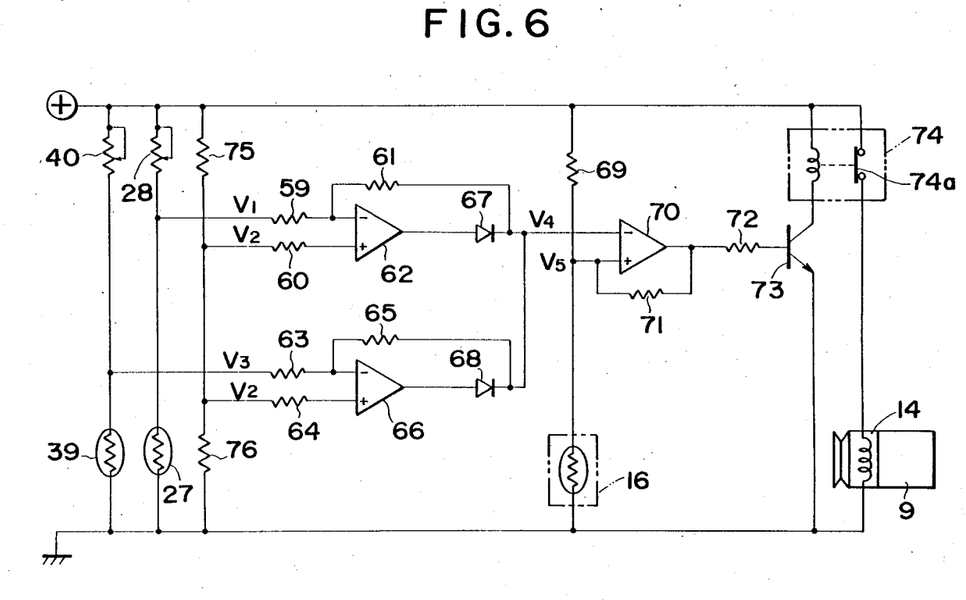
FIG. 6 is a circuit diagram of the electric control unit for controlling operation of the compressor.

FIG. 6 illustrates an electric circuit for conducting the foregoing steps 51-57. In this circuit, the front-seat cooling load detecting means 100 is constituted by the front-seat temperature sensor 27, the front-seat temperature setter 28, resistors 59, 60, 61 and an operational amplifier 62. A voltage V1 determined by the ratio between the front-seat temperature setter 28 and the front-seat temperature sensor 27 is imputed to the negative terminal of the operational amplifier 62 whose positive terminal receives a reference voltage V2 determined by the ratio between the resistors 75 and 76. As a result, it appears on the output terminal of the operational amplifier 62 an output signal having a value of (1+A1)V2−A1V1 where A1 is a gain of the operational amplifier 62.

The rear-seat cooling load detecting means 200 includes the rear-set temperature sensor 39, the rear-seat temperature setter 40, resistors 63, 64, 65 and an operational amplifier 66. This means 200 is structurally the same as the front-seat cooling load detecting means 100 so that from the output terminal of the operational amplifier 66, it is delivered an output signal having a value of (1+A2)V2−A2V3 where A2 is a gain of the operational amplifier 66. This value corresponds to the difference between a reference value V2 and a voltage V3 which is determined by the ratio between the rear-seat temperature sensor 39 and the rear-seat temperature setter 40.

The discriminating means 300 is constituted by a pair of diodes 67, 68 so connected as to output a larger one of the output signals from the operational amplifiers 62, 63 as an output voltage V4. Thus, a larger temperature difference between the detected temperature and the set temperature is delivered from the diodes.

The control means 400 includes the mode sensor 16, a resistor 69, a comparator 70, resistors 71, 72, a transistor 73 and a relay 74. The negative terminal of the comparator 70 receives the output voltage V4 whereas the positive terminal of the comparator 70 receives a voltage V5 corresponding to the temperature of the evaporator 8. The voltages V4 and V5 are compared with each other and when V5 is larger than V4, the relay is energized to open its normally-closed contact 74a whereupon the magnetic clutch 14 is de-energized to thereby stop the compressor 9. Accordingly, the on-off temperature of the compressor 9 varies with the temperature difference Tr−Td or Tr'−Td' in such a manner as shown in FIG. 5 at 56 or 57.

According to the present invention, a cooling load of the front-seat space and a cooling load of the rear-seat space are compared and then a larger load is used to vary the on-off temperature of the compressor. The air conditioner system having thus controlled can operate with a minimum power consumption and provide a comfortable air condition in the vehicle passenger compartment.

Obviously, many modifications and variations of the present invention are possible in the light of the above teachings. It is therefore to be understood that within the scope of the appended claims, the invention may be practiced otherwise than as specifically described.

What is claimed is:

1. An air conditioner system for a vehicle driven by an engine and including a passenger compartment composed of a front-seat space and a rear-seat space, comprising:
   (a) a refrigerant compressor driving connected with the engine;
   (b) a duct unit comprising:
      (1) a front-seat air conditioner unit including a main duct, a blower disposed in said main duct for forcing air therethrough to the front-seat part, an evaporator held in fluid communication with said compressor for cooling air passing therethrough and a heater core disposed in said main duct at a rear side of said evaporator for heating air passing therethrough;
      (2) a rear-seat blower unit including a rear-seat duct and a rear-seat blower disposed in said rear-seat duct for forcing air therethrough to the rear-seat part, said rear-seat duct including an air mix chamber defined a front side of said rear-seat blower;
      (3) at least two connecting passages interconnecting said main duct and said mix chamber, one of said connecting passages having an inlet opening to said main duct between said evaporator and said heater core, and another of said connecting passages having an inlet opening to said main duct at a rear side of said heater core; and (4) a means for adjusting the proportion of air introduced from said main duct through said connecting passage into said air mix chamber;
(c) first means for detecting a cooling load of the front-seat space;
(d) second means for detecting a cooling load of the rear-seat space;
(e) third means operative connected with said first and second detecting means for discriminating magnitude of the cooling loads thus detected; and
(f) fourth means operative connected with said discriminating means and said compressor for controlling the latter according to a predetermined pattern based on the result of discrimination of said discriminating means.

2. An air conditioner system according to claim 1, said first detecting means including a first temperature sensor disposed in the front-seat space for detecting a temperature thereof, a first temperature setter disposed in front-seat space for setting a desired temperature thereof and a first computing means connected with said first temperature sensor and said first temperature setter for computing a difference between the detected front-seat temperature and the set desired front-seat temperature, said second detecting means including a second temperature sensor disposed in the rear-seat space for detecting a temperature thereof, a second temperature setter disposed in the rear-seat space for setting a desired temperature therefor, and second computing means connected with said second temperature sensor and said second temperature setter for computing a difference between the detected rear-seat temperature and the set desired rear-seat temperature, said discriminating means being connected with said first and second computing means for selecting a larger one of the temperature difference thus computed, said control means including a comparator connected with said discriminating means for comparing the selected larger temperature difference with a reference temperature, and a relay operative connected with said comparator and said compressor for energizing said compressor when the selected temperature difference is larger than the reference temperature.

3. An air conditioner system according to claim 2, including a mode sensor disposed in said duct unit adjacent to said evaporator for detecting said reference temperature.

* * * * *